US010556721B2

(12) United States Patent
Nelson et al.

(10) Patent No.: US 10,556,721 B2
(45) Date of Patent: Feb. 11, 2020

(54) CLASP FOR TETHERING

(71) Applicant: Encore Packaging LLC, Vernon Hills, IL (US)

(72) Inventors: Timothy H. Nelson, Winnetka, IL (US); Stephenson Nelson, Winnetka, IL (US)

(73) Assignee: Encore Packaging LLC, Lake Bluff, IL (US)

(*) Notice: Subject to any disclaimer, the term of this patent is extended or adjusted under 35 U.S.C. 154(b) by 500 days.

(21) Appl. No.: 15/334,749

(22) Filed: Oct. 26, 2016

(65) Prior Publication Data

US 2017/0043904 A1 Feb. 16, 2017
US 2019/0359379 A9 Nov. 28, 2019

Related U.S. Application Data

(63) Continuation-in-part of application No. 14/673,104, filed on Mar. 30, 2015, now Pat. No. 10,293,975, which is a continuation-in-part of application No. 29/503,350, filed on Sep. 25, 2014, now Pat. No. Des. 731,296, application No. 15/334,749, filed on Oct. 26, 2016, which is a continuation-in-part of application No. 29/559,608, filed on Mar. 30, 2016, now Pat. No. Des. 791,582.

(60) Provisional application No. 61/972,540, filed on Mar. 31, 2014, provisional application No. 61/990,515, filed on May 8, 2014, provisional application No. 62/029,099, filed on Jul. 25, 2014.

(51) Int. Cl.
*B65D 19/44* (2006.01)
*B65B 11/02* (2006.01)

(52) U.S. Cl.
CPC .............. *B65D 19/44* (2013.01); *B65B 11/02* (2013.01); *B65D 2519/0081* (2013.01)

(58) Field of Classification Search
CPC ....... B65D 19/44; B65B 67/08; B65B 11/006; B65B 13/34; F16G 11/00; Y10T 24/3916
USPC .......................... 53/399; 439/369; 24/129 R
See application file for complete search history.

(56) References Cited

U.S. PATENT DOCUMENTS

| | | |
|---|---|---|
| 423,312 A | 3/1890 | Clark |
| 479,509 A | 7/1892 | Heaphy |
| 1,366,212 A | 1/1921 | Pollard |
| 1,583,343 A | 5/1926 | Duerden |
| 1,666,623 A | 4/1928 | Hoover |
| 2,229,935 A | 1/1941 | Powers |
| D258,044 S | 1/1981 | Kimball |

(Continued)

*Primary Examiner* — Robert F Long
*Assistant Examiner* — Xavier A Madison
(74) *Attorney, Agent, or Firm* — Fitch, Even, Tabin & Flannery LLP

(57) ABSTRACT

A clasp or clamp secures a string or rope, such as made from stretch wrap, to an object such as in securing an object to a pallet for shipping. The clasp or clamping device readily secures one end of the string and allows for tightening of the string through pulling a second end of the string through a second portion of the clasp or clamping device. The second end of the string can be tied off or secured on the second portion of the clasp or claiming device. The clasp or clamping device further includes at least two protrusions extending from one of the first end and the second end, the at least two protrusions defining a space there-between. The space between the at least two protrusions includes a narrow portion to impede slippage of the string.

12 Claims, 13 Drawing Sheets

(56) References Cited

U.S. PATENT DOCUMENTS

| | | | |
|---|---|---|---|
| 4,355,444 A | 10/1982 | Haney | |
| D275,262 S | 8/1984 | Kimball | |
| 4,546,598 A | 10/1985 | Karpisek | |
| D287,329 S | 12/1986 | Hamatani | |
| D289,373 S | 4/1987 | Kimball | |
| 4,775,121 A | 10/1988 | Carty | |
| 4,957,232 A | 9/1990 | Sprague | |
| D311,487 S | 10/1990 | Platt | |
| 5,232,193 A * | 8/1993 | Skakoon | A61M 5/1418 24/130 |
| 5,234,185 A | 8/1993 | Hoffman | |
| D353,990 S | 1/1995 | Alfreds | |
| 5,501,369 A | 3/1996 | Tal | |
| D376,095 S | 12/1996 | Curtis | |
| 5,671,854 A | 9/1997 | Thomas | |
| D390,447 S | 2/1998 | Colen, Jr. | |
| 6,012,940 A | 1/2000 | Wheeler | |
| 6,092,444 A | 7/2000 | Hsiao | |
| 6,126,579 A * | 10/2000 | Lin | A63B 21/063 482/98 |
| D448,656 S | 10/2001 | Kalat | |
| 6,571,854 B1 | 6/2003 | Palmer | |
| D494,450 S | 8/2004 | Schultz | |
| 6,813,981 B2 | 11/2004 | Urban | |
| 7,195,511 B1 | 3/2007 | Ornt | |
| 7,210,649 B2 | 5/2007 | Yu Chen | |
| D587,988 S | 3/2009 | Johansson | |
| D604,589 S | 11/2009 | Johansson | |
| D613,137 S | 4/2010 | Wieberdink | |
| 7,722,644 B2 | 5/2010 | Fallin | |
| D624,378 S | 9/2010 | Wysopal | |
| D627,632 S | 11/2010 | Elmer | |
| D640,527 S | 6/2011 | Hoek | |
| 8,056,265 B2 | 11/2011 | Pirkle | |
| D657,869 S | 4/2012 | Mammen | |
| D660,740 S | 5/2012 | Cullen | |
| D662,087 S | 6/2012 | Peller | |
| D675,123 S | 1/2013 | Nunez | |
| D676,310 S | 2/2013 | Lowrance | |
| D684,845 S | 6/2013 | Wood | |
| 8,615,849 B2 | 12/2013 | Rothbaum | |
| D702,109 S | 4/2014 | Weinberg | |
| D708,045 S | 7/2014 | Ressler | |
| D710,678 S | 8/2014 | Miller | |
| D710,679 S | 8/2014 | Miller | |
| D713,240 S | 9/2014 | Chance | |
| D730,159 S | 5/2015 | Grimm | |
| D731,296 S | 6/2015 | Nelson | |
| D732,933 S | 6/2015 | Jansen | |
| D735,632 S | 8/2015 | Beidler | |
| D753,985 S | 4/2016 | Nelson | |
| D791,582 S | 7/2017 | Nelson et al. | |
| D798,352 S | 9/2017 | Si | |
| D801,784 S | 11/2017 | Simon | |
| D803,164 S | 11/2017 | Noble | |
| 2005/0082115 A1 | 4/2005 | Petzl | |
| 2014/0196256 A1 | 7/2014 | Garcia | |
| 2018/0051828 A1 | 2/2018 | Boriack | |

\* cited by examiner

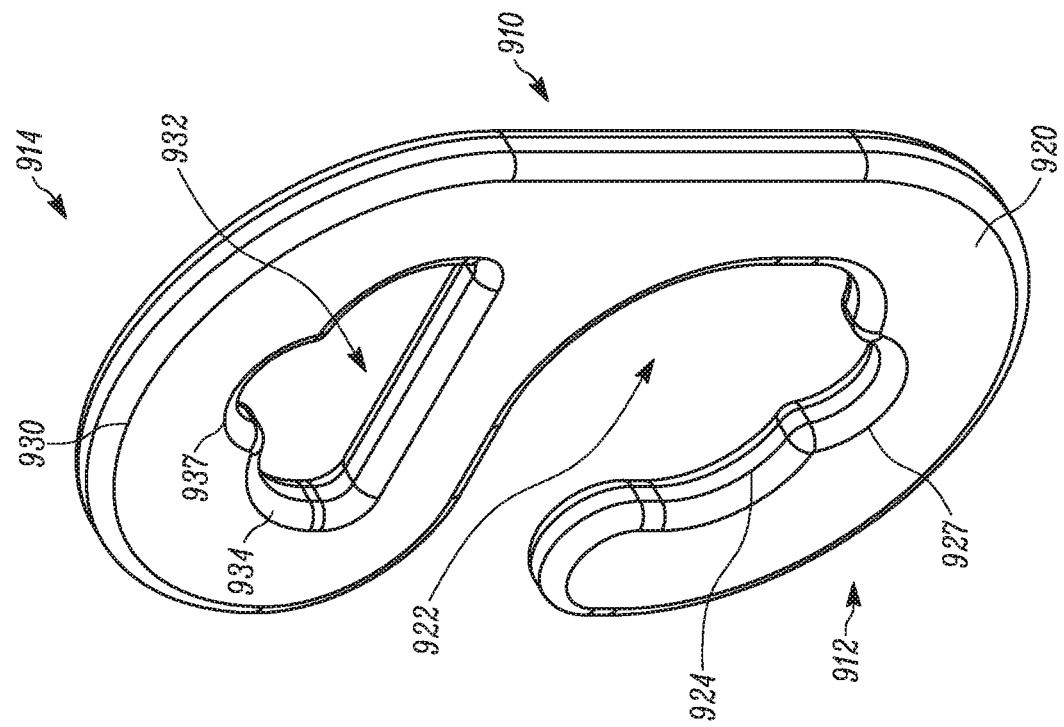
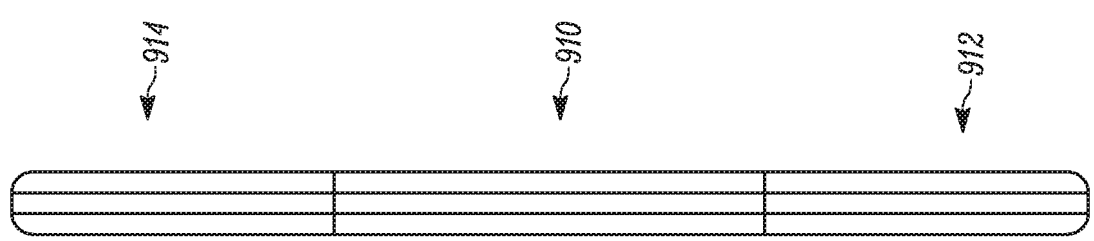
FIG. 10
FIG. 9

CLASP FOR TETHERING

RELATED APPLICATIONS

This application is a continuation-in-part of U.S. patent application Ser. No. 14/673,104 filed Mar. 30, 2015, which is a continuation-in-part of design patent application Ser. No. 29/503,350 filed Sep. 25, 2014, now issued as U.S. Pat. No. D731,296, and is a continuation-in-part of design patent application Ser. No. 29/528,884, filed Mar. 30, 2016, and claims the benefit of U.S. provisional patent application No. 61/972,540 filed Mar. 31, 2014, U.S. provisional patent application No. 61/990,515 filed May 8, 2014, and U.S. provisional patent application No. 62/029,099 filed Jul. 25, 2014, all of which are incorporated by reference herein in their entireties.

TECHNICAL FIELD

The invention relates generally to the packaging industry and, more specifically, to securing packaging material around items.

BACKGROUND

Stretch film or wrap is generally known in the industry as a material that can be used to securely wrap a collection of objects together using the stretch material's resiliency and dinginess. Stretch wrap is typically understood to be a polyethylene stretch film that is generally dispensed from a roll form for use in a variety of applications. For instance, stretch wrap is held against a collection of objects and dispensed and stretched around the collection of objects and wrapped over itself up to several times to cover and hold together the collection of objects. In the shipping industry, for example, a collection of materials may be placed on a pallet to secure such articles together during the shipping process. A collection of boxes placed on a pallet can be shipped as a single cohesive unit when bound together through wrapping with stretch wrap. Other applications of stretch wrap are known such as wrapping agricultural products or simply binding together a collection of items.

Although such usages for stretch wrap are well known and documented, the amount of stretch wrap used in any given application can be extensive. Moreover, it is common to secure the wrapped objects to the pallet through use of one or more straps. Such straps are typically metal or plastic bands that wrap over the object and through the pallet's under body. The metal or plastic band has two ends that are pulled tight and clamped together to secure the load to the pallet. Such strapping is expensive and generally not reusable. In addition, it is time consuming as the user must move the strapping over to the package, tighten the strapping with tooling and then secure the strapping together using some type of mechanical device.

The containment strength of stretch film is typically horizontal (around the load) rather than vertical (top to bottom) of the load. Often companies uses both strapping and stretch film in combination to secure a shipment.

SUMMARY

Generally speaking and pursuant to these various embodiments, a stretch film dispensing apparatus gathers the stretch film into a string or rope for use in securing an object to a pallet for shipping. The stretch film can be converted into a string or rope by passing it through one or more of a hook, funnel, apparatus, set of gears, or the like to effect stretching and/or twisting of the film into a string or rope. The properties of stretch film allow you to pull it tight, but in the process you are creating memory or resurrecting memory in the film. The more it is stretched the stronger the material gets before reaching the material's breaking point. This memory has a certain amount of elasticity and retention capability in it such that when stretched further during shipping the stretch film naturally retracts some, which is ideal for holding together loads that are moving and unlike typical string or rope that is rigid and does not have much give nor the ability to pull very tight when you pull on it to tighten it up around the package. The described approaches for making the string or rope from stretch film can be applied to regular, "pre-stretch," and other variations of stretch film, which are referred to collectively as "stretch film."

The stretch film is easy to tie off and then pulled through the knot like string or rope. Companies as a whole, however, are generally not willing to risk their products based on the knot tying ability of their employees. The stretch film properties allow it to be pulled through a clasp, making it easier to achieve additional tension around a load and secure the load in a more consistent basis. A clasp or clamping device that readily traps one end of the string and allows for tightening of the string while then a pulling a second end of the string through a second portion of the clasp or clamping device is ideal to secure a load. The second end of the string can be tied off or clamped on the second portion of the clasp or claiming device to secure the load. The design of the clasp and the stickiness of the stretch film allows the string to stay taught during the tying process and substantially not slip. Furthermore, the design of the clasp allows the stretch film string to be easily loaded while it is still attached to the dispenser so that less material is wasted when the second end is cut after securing the load.

The increase in stretch and gathering into strings of the stretch wrap results in a strong material that can hold together large loads similar to prior art straps while using a lower cost material, i.e., stretch wrap. The described clamp provides a ready ability to tighten and secure the strings to the load more easily and consistently. The clamp can be manufactured using a low cost and disposable or recyclable material. The process of securing the load via the stretch string/rope is also faster than the use of strapping. These and other benefits may become clearer upon making a thorough review and study of the following detailed description.

BRIEF DESCRIPTION OF THE DRAWINGS

The above needs are at least partially met through provision of the stretch wrap dispenser described in the following detailed description, particularly when studied in conjunction with the drawings, wherein:

FIG. 9 comprises a side plan view of another example clip or clamp apparatus to secure ends of stretch film string with illustrated dimensions in inches as configured in accordance with various embodiments of the invention;

FIG. 10 comprises a perspective view of the example clip or clamp apparatus of FIG. 9;

Figure 1:
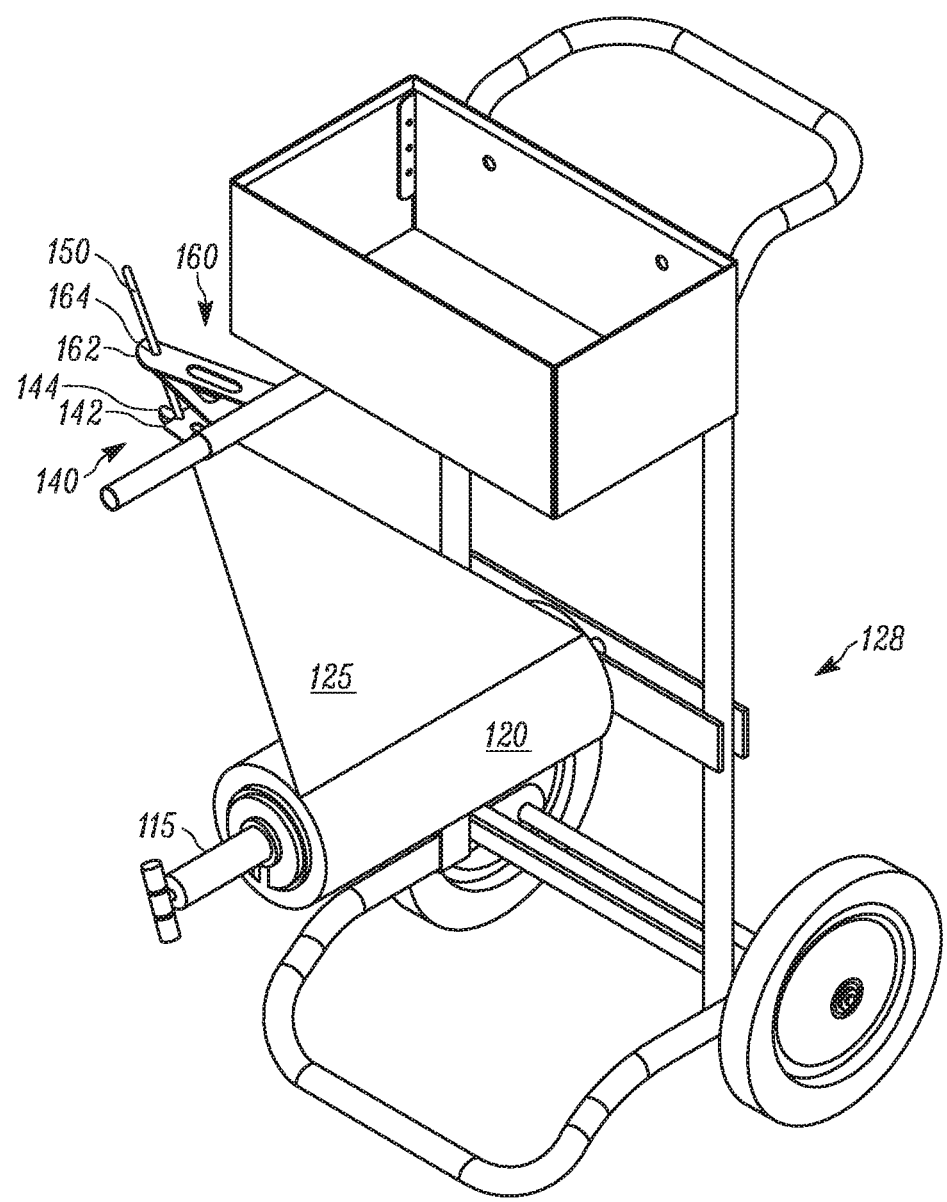
FIG. 1 comprises a perspective of an example stretch film dispenser for creating string or rope as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings and, in particular to FIGS. 1 and 2 an example of an apparatus for dispensing stretch film for application to an object will be described. In this example, a support frame 115 is configured to support a roll 120 of stretch film and dispense the stretch film 125 in response to tension on the stretch film 125. The support frame 115 in this example is mounted onto a cart 118 to facilitate movement around a shipping facility. The cart 118 supports a first gathering device 140 that is disposed to stretch and gather the stretch film 125 into a string 150 configured to wrap around the object. In one approach, the first gathering device 140 includes a flange 142 extending in a first plane 210. The roll 120 of stretch film 125 is disposed to dispense the stretch film 125 toward the first gathering device 140 from a first side 212 of the first plane 210. A hook device 144 extends from an end of the flange 142 distal from the roll 120 of stretch film 125 and oblique relative to the first plane 210 in a direction opposite the first side 212 of the first plane 210.

A second gathering device 160 is disposed to receive the string 150. The second gathering device 160 is configured to in response to a pulling force exerted on the string 150 away from the second gathering device 160 and from the first gathering device 140 one or both of: 1) stretch the string 150 and 2) twist the string 150. By one approach, the second gathering device 160 includes a second flange 162 extending in a second plane 220, wherein the second flange 160 is disposed to receive the string 150 from the first gathering device 140 from a first side 222 of the second plane 220. The second gathering device 160 in this example defines an aperture 163 configured to engage and stretch the string 150. The aperture 163 is defined by an extension 164 extending from an end the second flange 160 distal from the roll 120 of stretch film 125 and oblique relative to the second plane 220 in a direction opposite the first side 222 of the second plane 220. In a different approach, the second gathering device comprises a set of dual action gears configured to rotate in response to a pulling action on the string and to engage the string to stretch and twist the string during extraction of the string from the apparatus.

Figure 3:
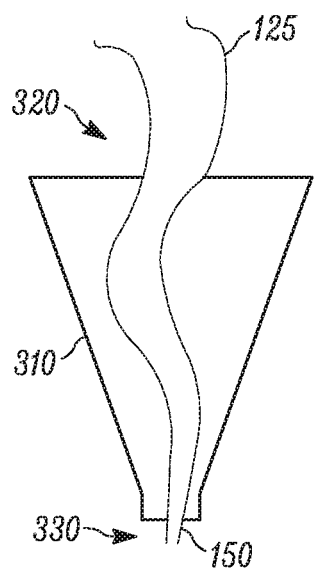
FIG. 3 comprises a cross-sectional view of an example funnel based gathering device as configured in accordance with various embodiments of the invention.

In various approaches, a portion of the second gathering device 160 that is configured to engage the string 150 provides a smaller space through which the string passes as compared to a portion of the first gathering device 140 that is configured to engage the stretch film 125 to stretch and gather the stretch film 125 into the string 150. This step down approach increases the amount of stretch applied the stretch film when forming it into a string, which in turn increases the resulting string's strength in securing an object, for example, to a pallet. FIG. 3 illustrates one such apparatus used for this string preparation. The illustrated approach can be applied to one or both of the first gathering device 140 and the second gathering device 160. As illustrated, a funnel 310 is configured to receive the stretch film 125 or string 150 through a large end 320 of the funnel 310 and engage, gather, and stretch the stretch film 125 or string 150 as it passes through the large end 320 of the funnel 310 to and through a small aperture 330 of the funnel 310.

Figure 4:
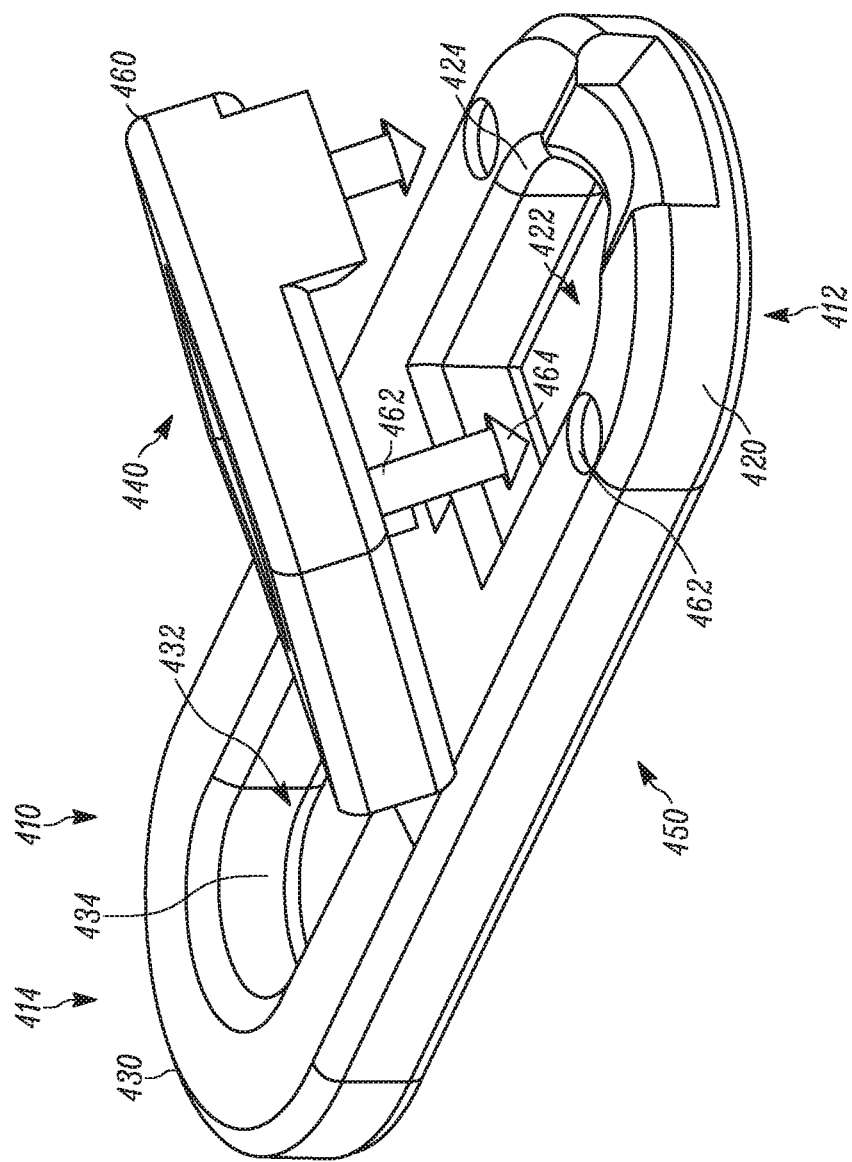
FIG. 4 comprises a perspective view of an example clip or clamp apparatus to secure ends of stretch film string as configured in accordance with various embodiments of the invention.

Because a sting 150 of stretch film 125 can slip when tied to itself, a clip or clamp can be used to secure opposing sends of the string 150 in a secure manner around the object. As illustrated in FIG. 4, an example of such an apparatus includes a longitudinal body 410 having a first end 412 and a second end 414 opposite to the first end 412. The longitudinal body 410 includes a first portion 420 that defines at the first end 412 a first aperture 422 having a curved section 424 on an inner portion of the first aperture 422 curving inwardly away from the first end 412 and toward the second end 414. The longitudinal body 410 also includes a second portion 430, separate and distal from the first portion 420, that defines at the second end 414 a second aperture 432 having a curved section 434 on an inner portion of the second aperture 432 curving inwardly away from the second end 414 and toward the first end 412.

The apparatus also includes at least one a clamping portion 440 rotatably secured to a middle portion 450 of the longitudinal body 410 and having a shape substantially corresponding to the first portion 420 of the longitudinal body 410. The clamping portion 440 includes a latch 460 configured to engage at least a portion of the first portion 420 of the longitudinal body 410 to secure a portion of the string between the clamping portion 440 and the longitudinal body 410. Although various latch designs can be used, in the illustrated example, the latch 460 comprises at least one post 462 extending from the clamping portion 440 toward the first portion 420 of the longitudinal body 410. The post 462 includes a detent 464 configured to engage and lock with a corresponding aperture 474 in the first portion 420 of the longitudinal body 410. Moreover, the clip or clamp can further include a second clamping portion clamping on the second portion of the longitudinal body and having features just like those of the first clamping portion. The whole clamping apparatus can be molded plastic with the clamping portion being integral with the rest of the body, where the plastic is flexible enough to allow the clamping portions to pivot about its connection to the middle portion of the longitudinal body. In another approach, the clamping apparatus or latch can be a separate piece pivotally secured to the middle portion of the longitudinal body.

Figure 5:
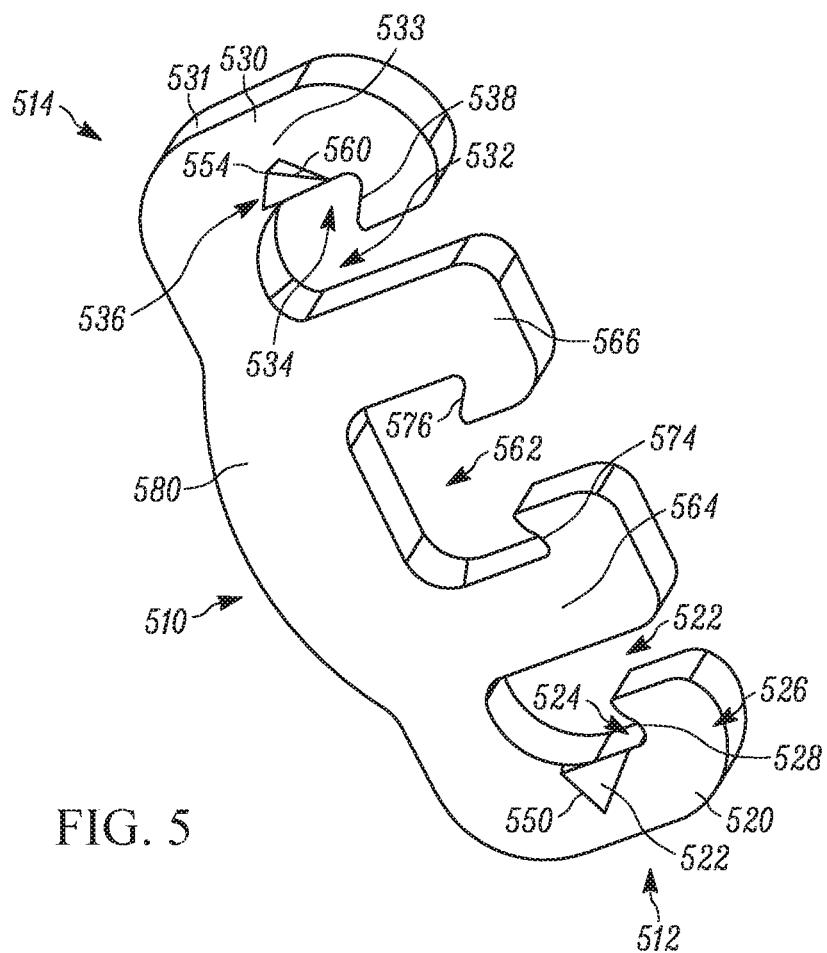
FIG. 5 comprises a front perspective view of an example clip or clamp apparatus to secure ends of stretch film string as configured in accordance with various embodiments of the invention.
Figure 6:
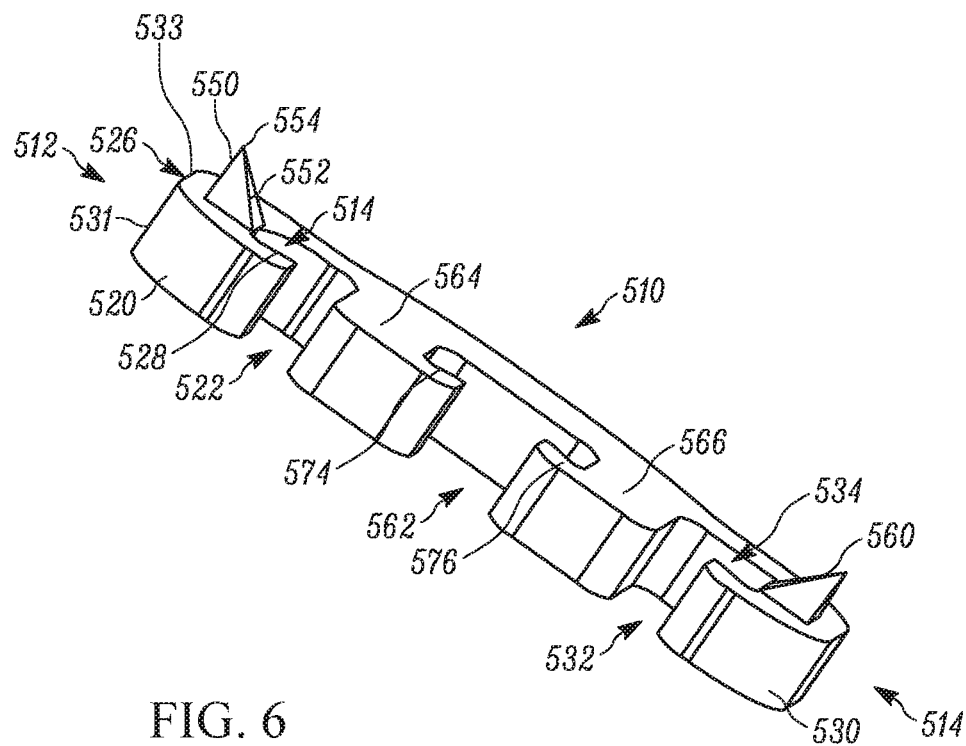
FIG. 6 comprises an edge perspective view of the example clip or clamp apparatus of FIG. 5.
Figure 7:
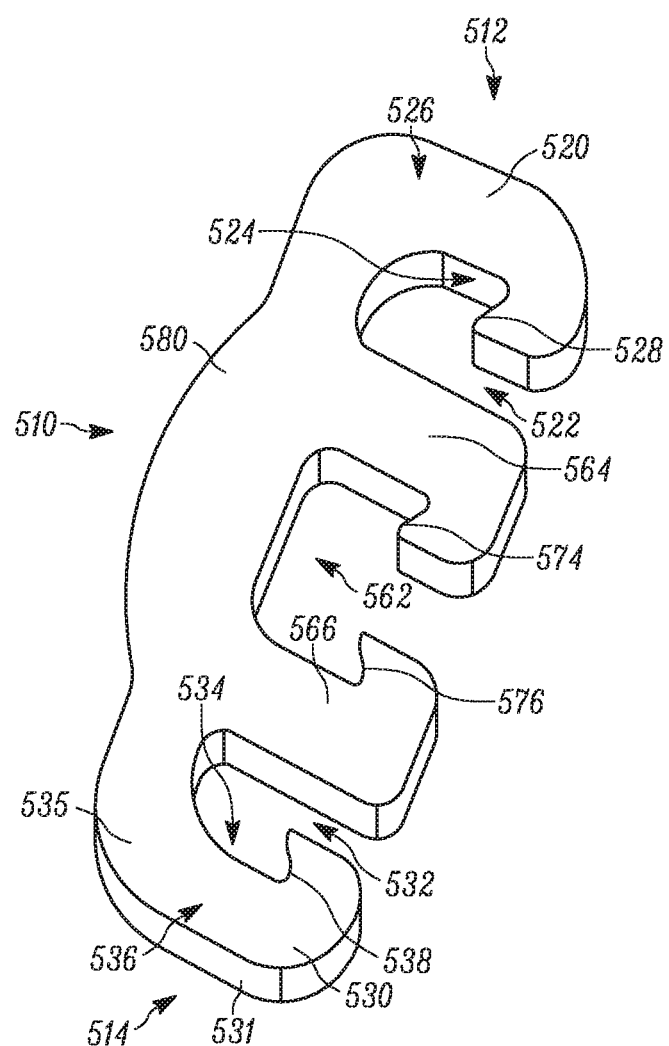
FIG. 7 comprises a back perspective view of the example clip or clamp apparatus of FIG. 5.

Another example clasp for using string created from stretch film to secure shipping materials to a shipping pallet will be described with reference to FIGS. 5-7. In this example, a longitudinal body 510 has a first end 512 and a second end 514 opposite to the first end 512. The longitudinal body 510 includes a first portion 520 that defines at the first end 512 a first aperture 522 having a curved section 524 (here defined by the hook shape of the first end 512) on an inner portion of the first aperture 522 curving inwardly away from the first end 512 and toward the second end 514. For example, the first aperture 522 can be defined in part by a first finger 526 having a hook 528 extending toward the inner portion of the first aperture 522 from the first finger 526. The longitudinal body 510 also includes a second portion 530, separate and distal from the first portion 520, that defines at the second end 514 a second aperture 532 having a curved section 534 (here defined by the hook shape of the second end 514) on an inner portion of the second aperture 532 curving inwardly away from the second end 514 and toward the first end 512. For instance, the second aperture 532 can be defined in part by a second finger 536 having a hook 538 extending toward the inner portion of the first aperture 532 from the second finger 536.

In one aspect, the clasp apparatus includes a protrusion 550 extending from a distal end of the longitudinal body 510 at the first portion 520 and shaped to engage a portion of the string to impede slippage of the string into the first aperture 522. Although described here with respect to the first portion 512 of the longitudinal body 510, a same or similar protrusion can be similarly disposed with respect to the second portion 514 of the longitudinal body 510. In this example, placement of the protrusion 550 at the distal end of the longitudinal body 510 is meant to indicate anywhere on the surface of the first portion 520 against which a string is likely to press when the string is secured to an object using the clasp apparatus. Thus, for example, instead of being placed as illustrated in FIGS. 5-7, the protrusion(s) could be at any position between the aperture 522 and the distal end of the first portion 522, including possibly on the distal edge 531 of the first portion 512 in lieu of or in addition to being on a top surface 533 of the first portion 522. It is also possible to place one or more protrusions on a bottom surface 535 of the longitudinal body 510, for example, to impede slippage of the clasp along a secured object or to engage the string. In other approaches, the bottom surface 535 may be free from such protrusions to avoid damage to the secure object or to facilitate placement of the clasp along the object.

The protrusion 550 can be shaped in any number of ways to facilitate placement and securement of the string through and to the longitudinal body 510. In the illustrated example, the protrusion 550 defines a first sloped surface 552 facing in a direction of the first aperture 522. This sloped surface 552 facilitates pulling of the string through the aperture 522 during the fastening process. The sloped surface 552 terminates in a point 554 disposed to engage the string to impede its slippage into the aperture 522 when secured by the clasp's longitudinal body 510 to a second end of the string when securing an object.

In a further aspect, the longitudinal body 510 can further define a middle aperture 562 between the first aperture 522 and the second aperture 532. In the illustrated example, the middle aperture 562 is defined in part by opposing fingers 564 and 566 having respective hooks 574 and 576 extending toward each other from the opposing fingers 564 and 566. So configured, the string can be wrapped through the middle aperture 562 and secured by the hooks 574 and 576 to provide additional options for securing the string to an object using the longitudinal body 510. To provide additional strength, a middle section of the longitudinal body 510 may include extra material 580. The body 510 may be manufactured out of any suitable material such as metal or plastic having sufficient strength to withstand the loading tensions experienced by the string during attachment to an object and shipping of that object when secured by the string using the body 510. Clasps made with such materials can be inexpensive to produce and may be reused many times thereby providing a low cost way to improve securing shipped objects, especially in high volume two-way shipping centers where incoming shipment can provide a center with an ongoing and cost-free source of such clasps.

Figure 8:
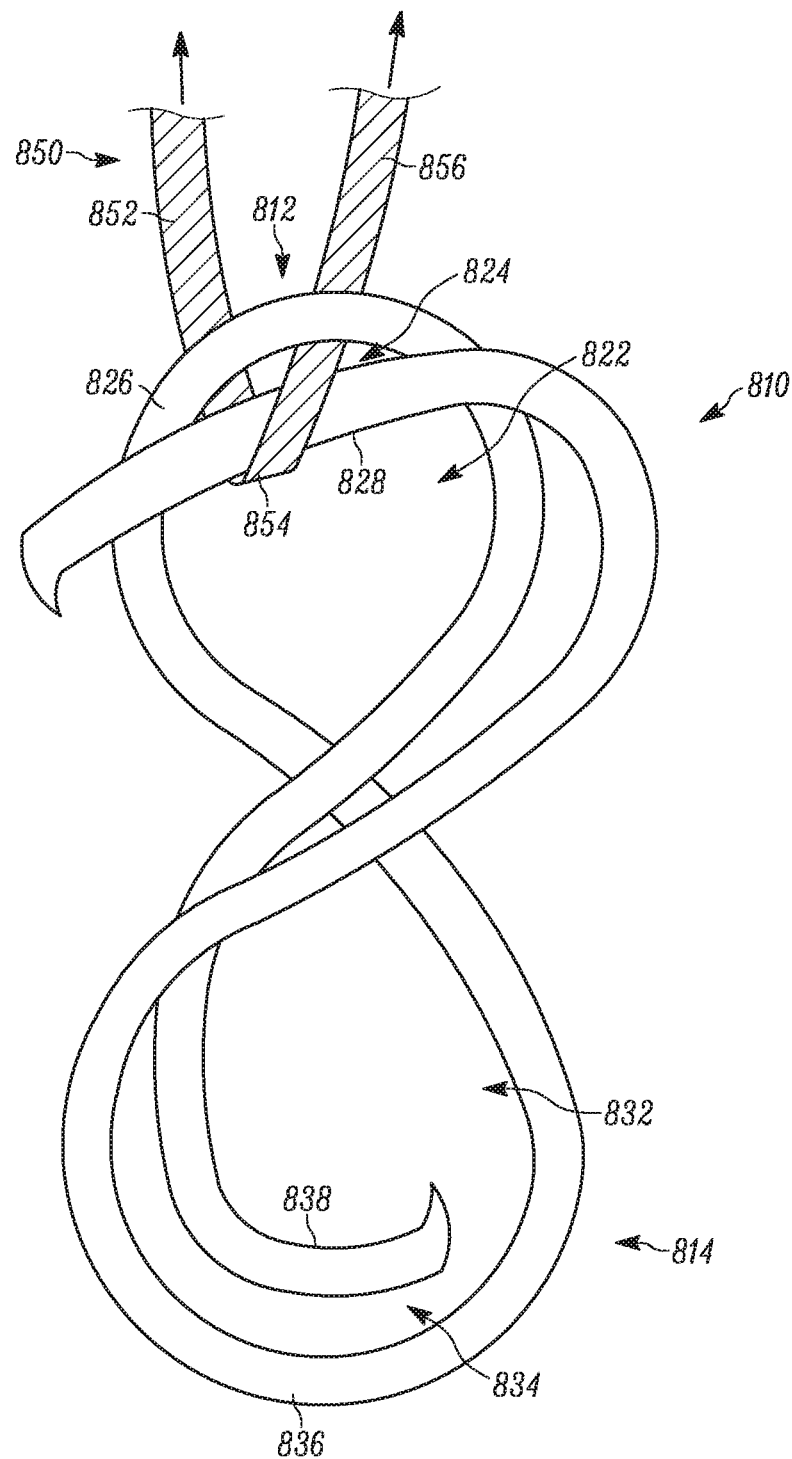
FIG. 8 comprises a front view of an example wire clip configured in accordance with various embodiments of the invention.

FIG. 8 illustrates still another example approach to a clasp that can be used to secure string made from stretch wrap to an object. In this example, a metal wire 810 is bent into a figure "8" shape, thereby defining a first aperture 822 and a second aperture 832 at opposing ends 812 and 814, respectively, of the clasp. In addition to placing the string through the apertures 822 and 832, the string can be run through the spacing 824, 834 between bends 826 and 828 or 836 and 838 of the wire 810 at one or both of the opposing ends 812 and 814. For example, a stretch film string 850 can have a first string portion 852 passed first through the first aperture 822 and then have a second string portion 854 wrap around one of the bends 826 or 828 while passing through the spacing 824 between the bends 824 and 828. When the stretch film string portions 852 and 856 are pulled tight such as indicated by the arrows of FIG. 8, the bend 828 around which the second string portion 854 is wrapped is pulled tightly against the other bend 826, thereby locking the string into position between the bends. This locked position is further secured via the dinginess of the stretch film string gripping the bends 826 and 828, which is further facilitated by stretching of the string during the tightening process around the bends. The same process can be applied to secure string to the second end 814 of the clasp or clip of FIG. 8. Moreover, although the illustrated approach shows two bends 826 and 828 or 836 and 838 at each end, more bends at either or both ends could be made.

Figure 11:
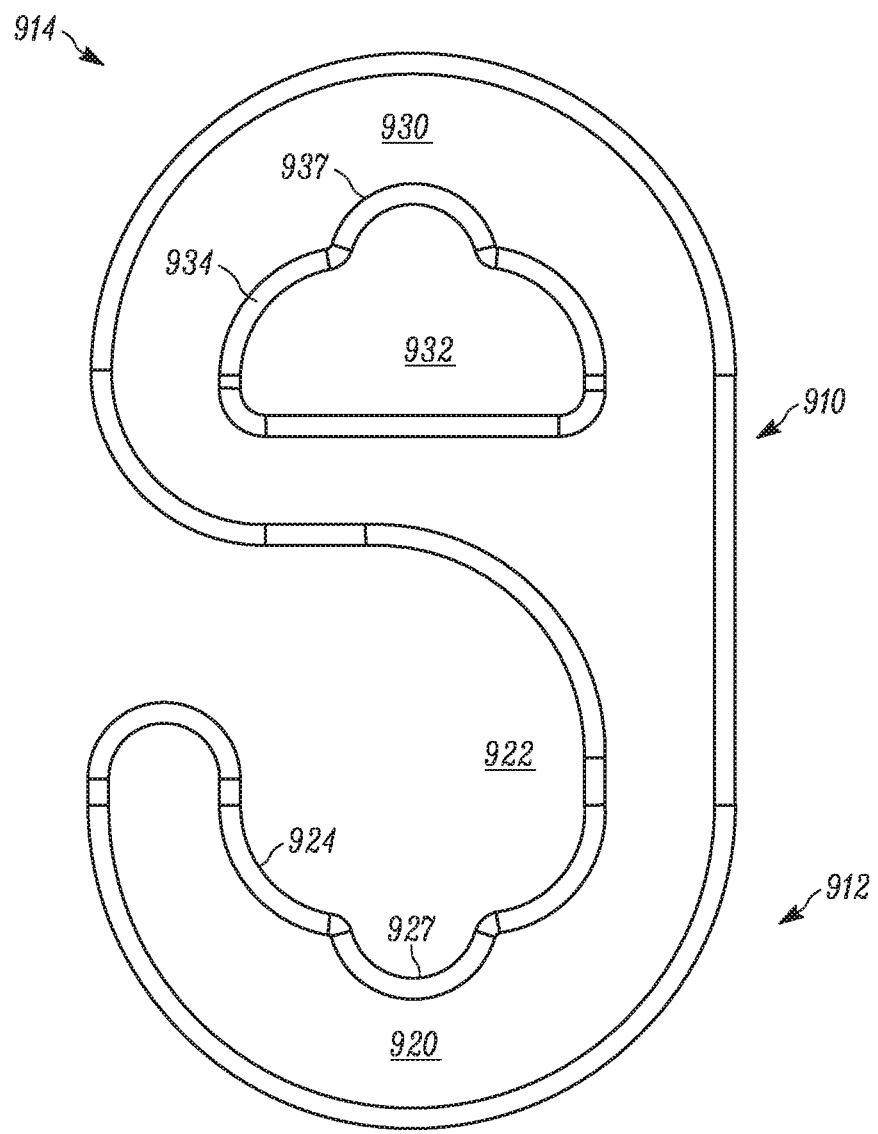
FIG. 11 comprises a front plan view of the example clip or clamp apparatus of FIG. 9 including example possible dimensions in inches.
Figure 12:
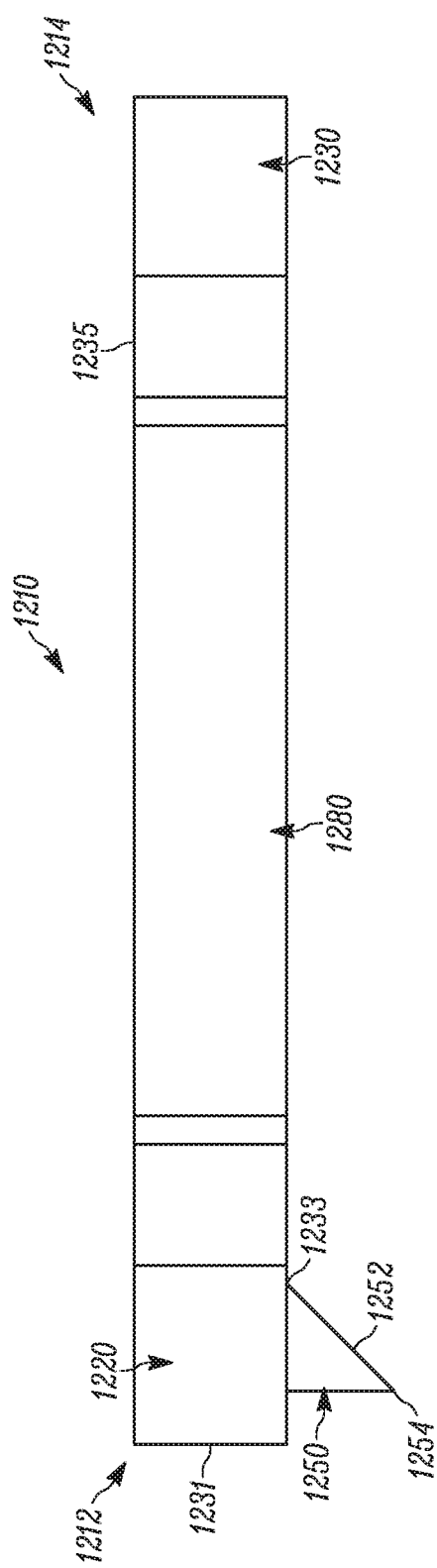
FIG. 12 comprises a side plan view of yet another example clip or clamp apparatus to secure ends of stretch film string as configured in accordance with various embodiments of the invention.
Figures 13, 14:
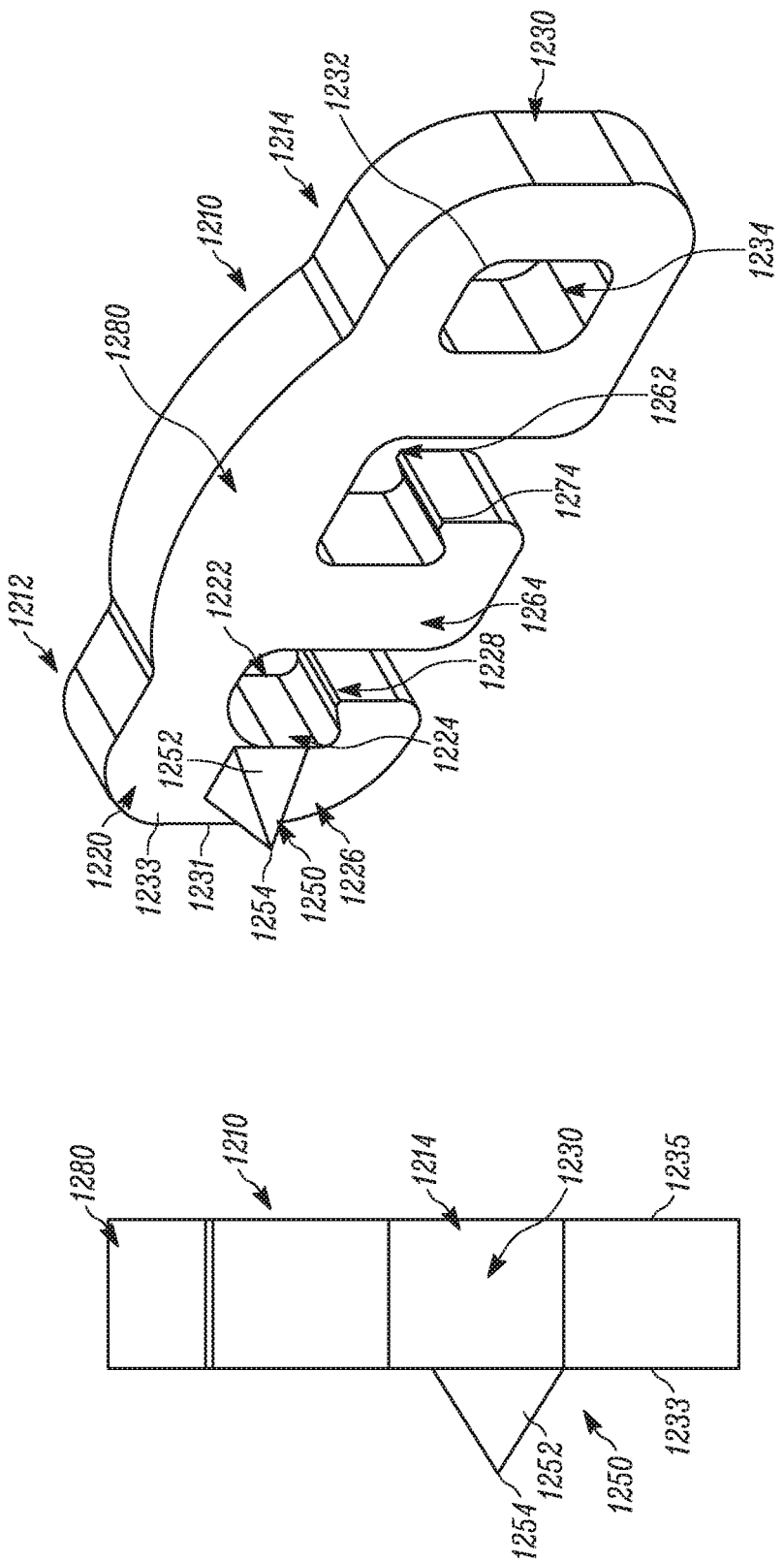
FIG. 13 comprises a bottom plan view of the example clip or clamp apparatus of FIG. 12 with illustrated dimensions in inches as configured in accordance with various embodiments of the invention.
FIG. 14 comprises a perspective view of the example clip or clamp apparatus of FIG. 2.
Figure 15:
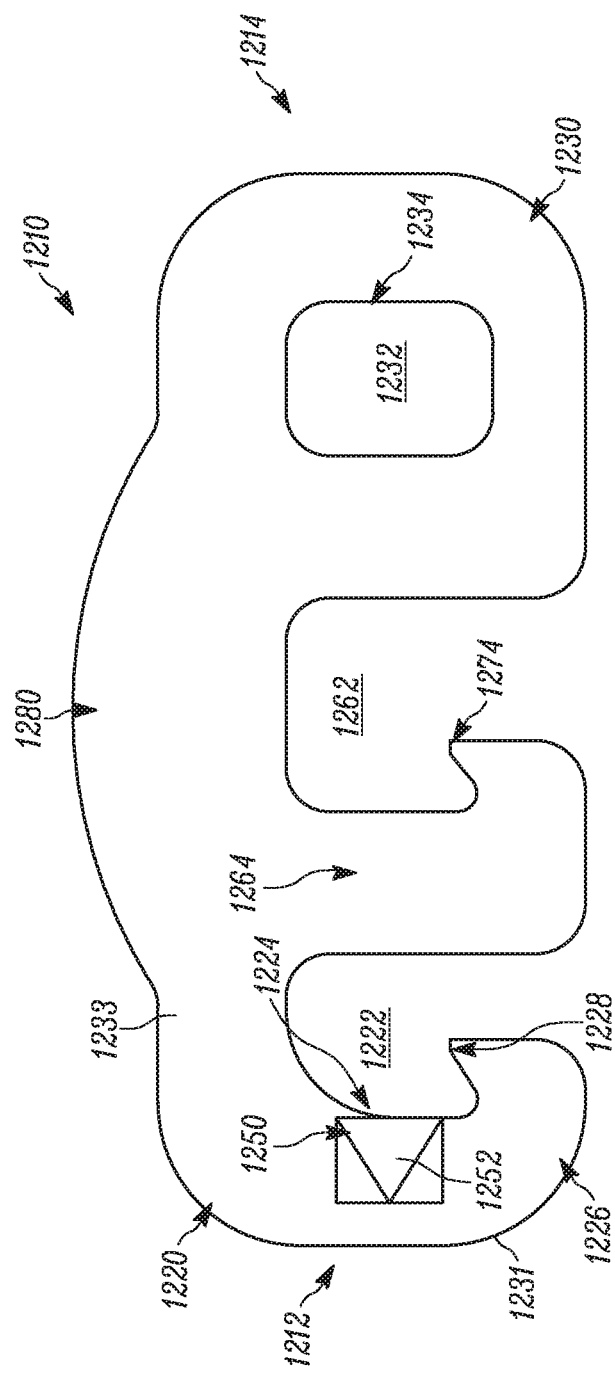
FIG. 15 comprises a front plan view of the example clip or clamp apparatus of FIG. 12 including example possible dimensions in inches.

FIGS. 9-11 illustrate another example approach to a clip or clasp used to secure stretch string. In this example, a longitudinal body 910 has a first end 912 and a second end 914 opposite to the first end 912. The longitudinal body 910 includes a first portion 920 that defines at the first end 912 a first aperture 922 having a curved section 924 (here defined by the hook shape of the first end 912) on an inner portion of the first aperture 922 curving inwardly away from the first end 912 and toward the second end 914. The curved section 924 in this example includes an indentation 927 to facilitate engagement of a string of stretch rope that fits within the indentation 927. The longitudinal body 910 also includes a second portion 930, separate and distal from the first portion 920, that defines at the second end 914 a second aperture 932 having a curved section 934, here defined as a part of a hole in the second end 914. Like the first end 912, the curved section 934 in this example includes an indentation 937 to facilitate engagement of a string of stretch rope that fits within the indentation 937.

As illustrated in FIG. 9, the longitudinal body of this example is flat and relatively thin, made of a metal such as a cold rolled steel. Because string made from stretch film typically adheres to a metal such as steel, this example does not include a protrusion configured to engage a portion of the string to impede slippage of the string, although one or more such protrusions could be added.

In use, a user will typically tie a first free end of a string of stretch film to the longitudinal body 910 at the second end 914 through the aperture 932. The user will then wrap the free end of the string around the object to be secured and loop the free end over the hook portion of the curved section 924. The user will then tighten the string by pulling the free end over the hook, which tightening pulls the string into the indentations 927 and 937 on either side of the longitudinal body 910. After the string is sufficiently tightened, the free end of the string is tied around the hooked end 920 of the longitudinal body 910, thereby securing the object.

A still further example is illustrated in FIGS. 12-15. This example illustrates a modified version of the clip of FIGS. 5-7, where the second end is modified to define a hole instead of a hook and does not include a protrusion. In this case, the first free end of the string is tied to itself around the end with the hole such that a protrusion is not needed to secure the string. More specifically, this example includes a longitudinal body 1210 has a first end 1212 and a second end 1214 opposite to the first end 1212. The longitudinal body 1210 includes a first portion 1220 that defines at the first end 1212 a first aperture 1222 having a curved section 1224 (here defined by the hook shape of the first end 1212) on an inner portion of the first aperture 1222 curving inwardly away from the first end 1212 and toward the second end 1214. For example, the first aperture 1222 can be defined in part by a first finger 1226 having a hook 1228 extending toward the inner portion of the first aperture 1222 from the first finger 1226. The longitudinal body 1210 also includes a second portion 1230, separate and distal from the first portion 1220, that defines at the second end 1214 a second aperture 1232 having a curved section 1234, here defined as a part of a hole in the second end 1214.

In one aspect, the clasp apparatus includes a protrusion 1250 extending from a distal end of the longitudinal body 1210 at the first portion 1220 and shaped to engage a portion of the string to impede slippage of the string into the first aperture 1222 to thereby maintain the string's tension around the secured object. Although described here with respect to the first portion 1212 of the longitudinal body 1210, a same or similar protrusion can be similarly disposed with respect to the second portion 1214 of the longitudinal body 1210. In this example, placement of the protrusion 1250 at the distal end of the longitudinal body 1210 is meant to indicate anywhere on the surface of the first portion 1220 against which a string is likely to press when the string is secured to an object using the clasp apparatus. Thus, for example, instead of being placed as illustrated in FIGS. 12-15, the protrusion(s) could be at any position between the aperture 1222 and the distal end of the first portion 1212, including possibly on the distal edge 1231 of the first portion 1222 in lieu of or in addition to being on a top surface 1233 of the first portion 1222. It is also possible to place one or more protrusions on a bottom surface 1235 of the longitudinal body 1210, for example, to impede slippage of the clasp along a secured object or to engage the string. In other approaches, the bottom surface 1235 may be free from such protrusions to avoid damage to the secure object or to facilitate placement of the clasp along the object.

The protrusion 1250 can be shaped in any number of ways to facilitate placement and securement of the string through and to the longitudinal body 1210. In the illustrated example, the protrusion 1250 defines a first sloped surface 1252 facing in a direction of the first aperture 1222. This sloped surface 1252 facilitates pulling of the string through the aperture 1222 during the fastening process. The sloped surface 1252 terminates in a point 1254 disposed to engage the string to impede its slippage into the aperture 1222 when secured by the clasp's longitudinal body 1210 to a second end of the string when securing an object.

In a further aspect, the longitudinal body 1210 can further define a middle aperture 1262 between the first aperture 1222 and the second aperture 1232. In the illustrated example, the middle aperture 1262 is defined in part by opposing portions including a finger 1264 having a hook 1274 and a portion of the second end 1230 that defines the aperture 1234. So configured, the string can be wrapped through the middle aperture 1262 and secured by the hook 1274 to provide additional options for securing the string to an object using the longitudinal body 1210. To provide additional strength, a middle section of the longitudinal body 1210 may include extra material 1280. The body 1210 may be manufactured out of any suitable material such as metal or plastic having sufficient strength to withstand the loading tensions experienced by the string during attachment to an object and shipping of that object when secured by the string using the body 1210.

Figure 16:
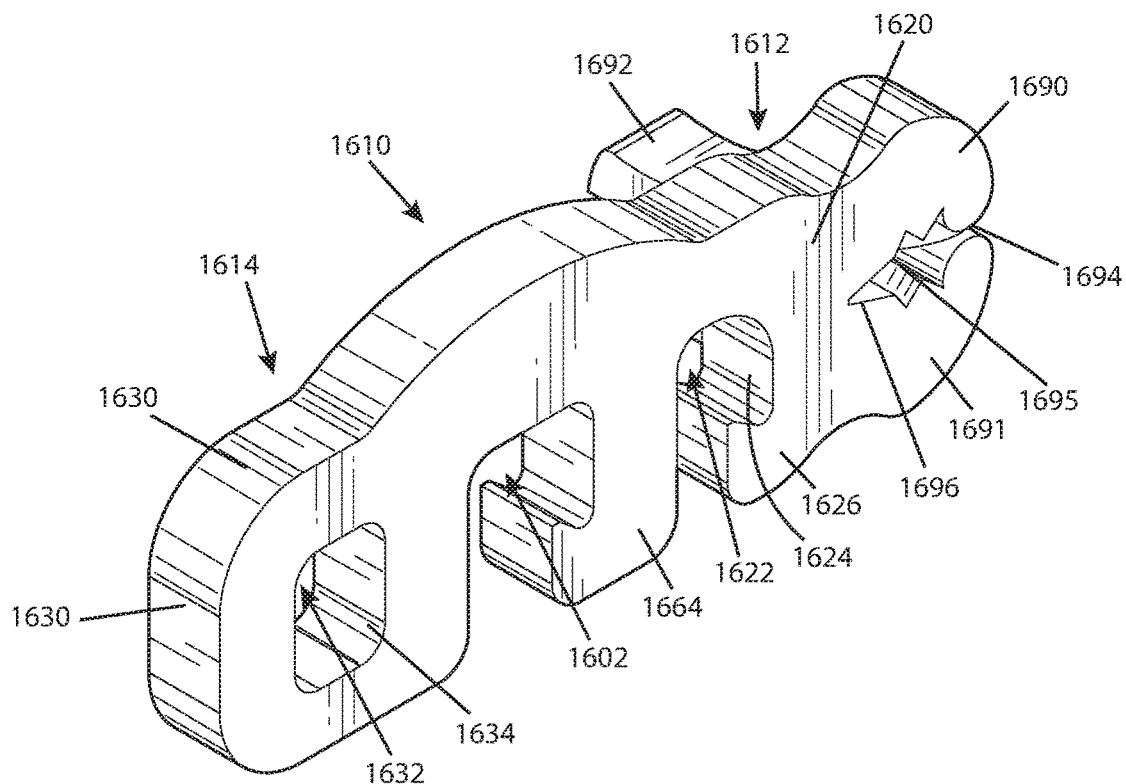
FIG. 16 comprises front perspective view of yet another example clip or clamp apparatus to secure ends of stretch film string as configured in accordance with various embodiments of the invention.
Figure 17:
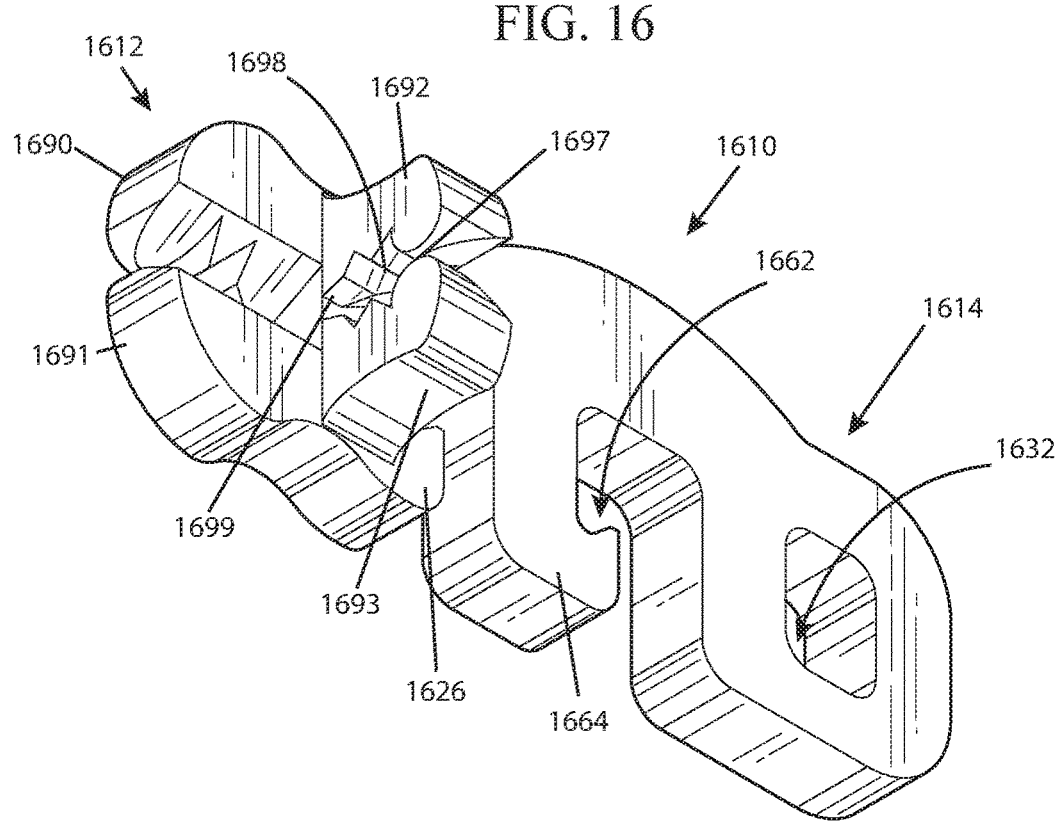
FIG. 17 comprises a back perspective view of the example clip or clamp apparatus of FIG. 16.

A still further example is illustrated in FIGS. 16-17. This example illustrates a modified version of the clip of FIGS. 12-15, where the first end is modified to have a coplanar pair of protrusions or fingers and a traverse pair of protrusions or fingers. Each pair of fingers define a space there-between narrowing to a point so as to impede slippage of a rope or string placed therein. Corresponding elements share the last two digits, therefor elements sharing a last two digits with elements in FIGS. 12-15 are assumed to operate in the same manner unless specified otherwise. In this case, the first free end of the string is tied to itself around the end with the hole such that a protrusion is not needed to secure the string. More specifically, this example includes a longitudinal body 1610 has a first end 1612 and a second end 1614 opposite to the first end 1612. The longitudinal body 1610 includes a first portion 1620 that defines at the first end 1612 a first aperture 1622. The longitudinal body also includes a middle portion, between the first end and the second end and defining at least one middle aperture defined in part by a finger having a hook extending inwardly toward the middle aperture.

The longitudinal body 1610 also includes a second portion 1630, separate and distal from the first portion 1620 that defines at the second end 1614 at least two protrusions 1690 and 1691 extending from the second end 1614. The protrusions 1690 and 1691 define a space there-between. The third protrusion or third finger 1690 and fourth protrusion or fourth finger 1691 are coplanar with the rest of the longitudinal body 1610. The third and fourth fingers 1690/1691 define a space there-between having a narrow open end portion 1694, a wide center portion 1695 and a narrow pinch point 1696. The pinch point 1696 is shaped to engage a portion of the string to impede slippage. Optionally, the two protrusions 1690 and 1691 define sloped surfaces 1702 and 1704 sloping toward each other toward the space defined between the at least two protrusions 1690 and 1691. In operation, the string can be thread through the wide center portion 1695 of the opening. As the string becomes tighter, it is forced into the pinch point 1696 which deforms the string at that point, impeding the string from being pulled back through. Alternatively, the string can be pulled towards the second portion 1630 of the body, causing the string to be forced into the pinch point 1696 thus impeding the string from slipping. Deformable string can be forced through the narrow open end portion 1694 with sufficient force instead of threading the string through the wide center portion 1695. The narrow end portion 1694 impedes the string from slipping out of the opening between the third and fourth fingers 1690/1691 when there is slack in the string.

The body 1610 optionally further includes a fifth finger 1692 and a sixth finger 1693 extending laterally traverse to the plane shared by the rest of the longitudinal body 1610. In another embodiment, the clip includes only the laterally traverse fingers and not the fingers parallel to the longitudinal body. The fifth and sixth fingers 1692/1693 define an opening there-between having a narrow open end 1697, a wide center portion 1698, and a pinch point 1699. The fifth and sixth fingers 1692/1693 operate in the same manner as the third and fourth fingers 1690/1691, namely a string can move relatively unimpeded through the wide center portion 1698, but is impeded from slipping through the pinch point 1699.

Figure 18:
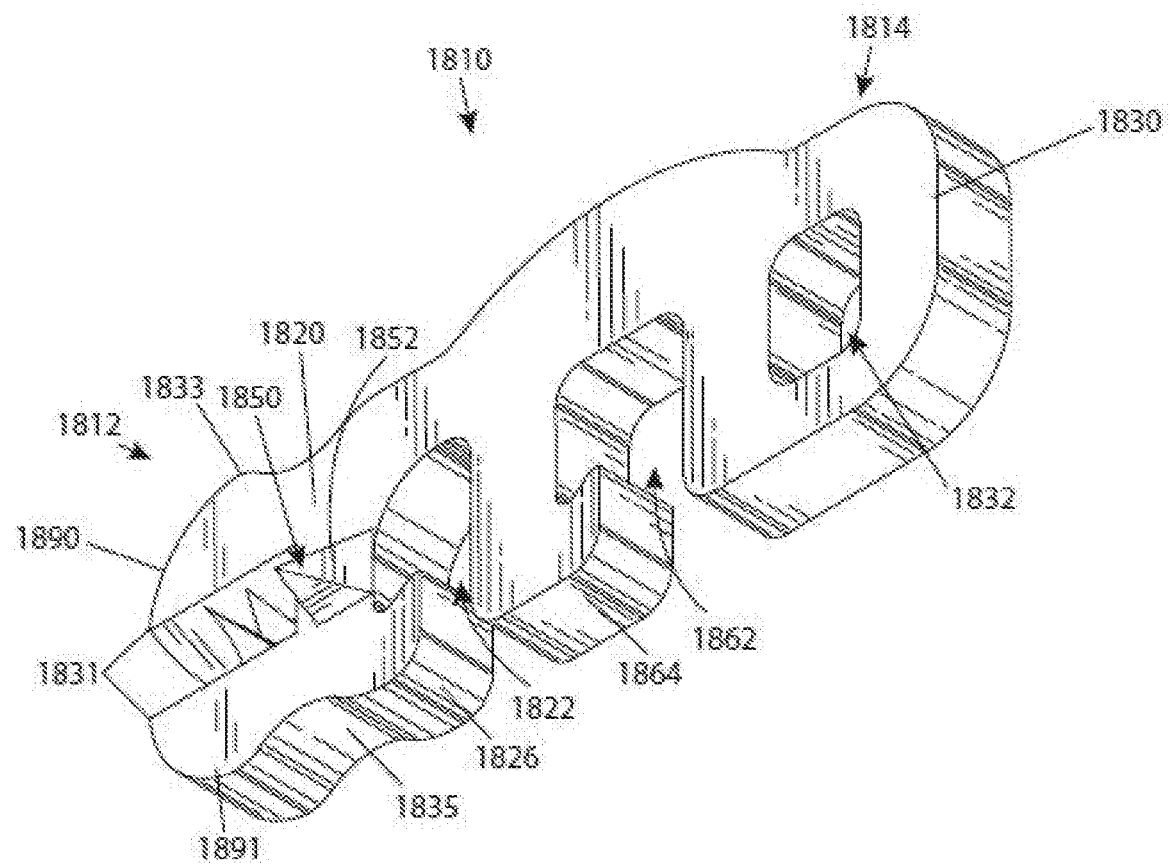
FIG. 18 comprises front perspective view of yet another example clip or clamp apparatus to secure ends of stretch film string as configured in accordance with various embodiments of the invention.

A still further example is illustrated in FIG. 18. This example illustrates a modified version of the clip of FIGS. 16-17, wherein the fifth and sixth fingers are replaced with the protrusion of FIGS. 12-15. The clasp apparatus includes a protrusion 1850 extending from a distal end of the longitudinal body 1810 at the first portion 1820 and shaped to engage a portion of the string to impede slippage of the string into the first aperture 1822 to thereby maintain the string's tension around the secured object. Although described here with respect to the first portion 1812 of the longitudinal body 1810, a same or similar protrusion can be similarly disposed with respect to the second portion 1814 of the longitudinal body 1810. In this example, placement of the protrusion 1850 at the distal end of the longitudinal body 1810 is meant to indicate anywhere on the surface of the first portion 1820 against which a string is likely to press when the string is secured to an object using the clasp apparatus. Thus, for example, instead of being placed as illustrated in FIG. 18, the protrusion(s) could be at any position between the aperture 1822 and the distal end of the first portion 1812, including possibly on the distal edge 1831 of the first portion 1822 in lieu of or in addition to being on a top surface 1833 of the first portion 1822. It is also possible to place one or more protrusions on a bottom surface 1835 of the longitudinal body 1810, for example, to impede slippage of the clasp along a secured object or to engage the string. In other approaches, the bottom surface 1835 may be free from such protrusions to avoid damage to the secure object or to facilitate placement of the clasp along the object.

Figure 2:
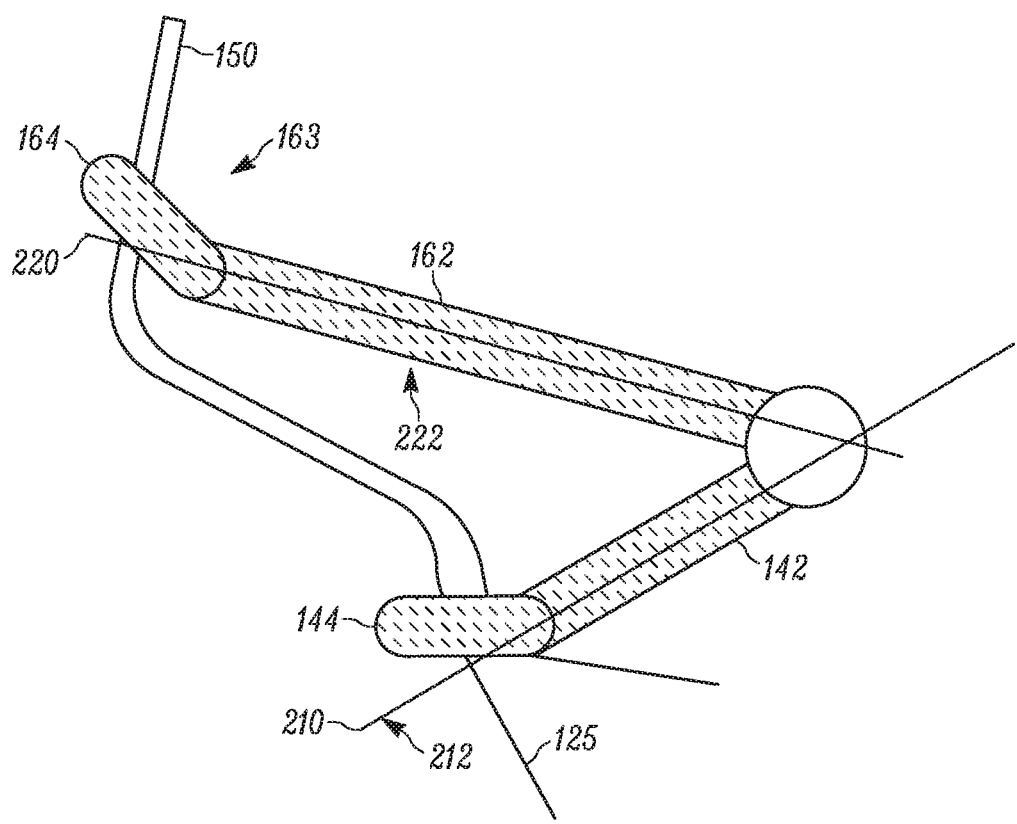
FIG. 2 comprises a side plan view of example first and second gathering devices used with an example stretch film dispenser for creating string or rope as configured in accordance with various embodiments of the invention.

In use, the stretch film dispenser of FIGS. 1 and 2 and the clips or clamps of FIGS. 4-18 can be used to secure an object to a pallet. For instance, stretch film is dispensed from a roll of stretch film supported by a support frame, and a first gathering device engages the stretch film to stretch and gather the stretch film into a string using any of the example gathering devices described herein. A second gathering device engages the string coming from the first gathering device to one or both of stretch the string and twist the string. The effect on the string is in response to a pulling force exerted on the string away from the second gathering device and the first gathering device. The string then engages the object and an inner surface of a pallet. A first end of the string is secured by a first end of the longitudinal body, for example, by wrapping the sting around a first end of the longitudinal body. A second end of the string is pulled through the second aperture at a second end of the longitudinal body to tighten the grip around the object and then secured by the second end, for example, by use of a protrusion disposed on the second portion of the longitudinal body.

So configured, a load can be secured to a pallet using lower cost string or rope made from stretch film instead of metal or plastic strapping. The lower cost stretch film string or rope can be secured to the pallet using attachment devices, which themselves can be low cost and reused. Thus, shipment costs can be reduced without loss of performance in load security.

Those skilled in the art will recognize that a wide variety of modifications, alterations, and combinations can be made with respect to the above described embodiments without departing from the scope of the invention. For instance, the various aspects of the illustrated clasp can be implemented individually or together in any combination. Such modifications, alterations, and combinations are to be viewed as being within the ambit of the inventive concept.

What is claimed is:

1. An apparatus for using string created from stretch film to secure shipping materials to a shipping pallet, the apparatus comprising:

a longitudinal body having a first end and a second end opposite to the first end, wherein the longitudinal body includes a first portion that defines at the first end a first aperture, wherein the longitudinal body includes a middle portion, between the first end and the second end and defining at least one middle aperture defined in part by a finger having a hook extending inwardly toward the middle aperture;

at least two protrusions extending from the second end, the at least two protrusions defining a space there-between, wherein the at least two protrusions define an opening there-between having a narrow open portion and a wide center portion wherein the narrow open portion is located farther from the longitudinal body than the wide center portion, and wherein the at least two protrusions define sloped surfaces sloping toward each other toward the space defined between the at least two protrusions.

2. The apparatus of claim 1 wherein the at least two protrusions include at least two lateral protrusions extending laterally from a side of the longitudinal body.

3. The apparatus of claim 2 wherein the at least two lateral protrusions extend from a base of protrusions extending in line with and toward a distal end of the longitudinal body.

4. The apparatus of claim 2 wherein 1) the at least two lateral protrusions and 2) the protrusions extending in line with and toward a distal end of the longitudinal body both are shaped to define an opening having a narrow open portion and a wide center portion wherein the narrow open portion is located farther from the longitudinal body than the wide center portion.

5. The apparatus of claim 1 wherein the at least one middle aperture includes at least two middle apertures, each defined in part by a finger having a hook extending inwardly toward the middle aperture.

6. The apparatus of claim 1 further comprising a pointed protrusion extending laterally from the longitudinal body to engage the stretch film.

7. A method for securing an object to a pallet, the method comprising:
engaging the object and an inner surface of a pallet with a string;
securing a first end of the string by a first end of a longitudinal body; and
securing a second end of the string by a second end of the longitudinal body;
wherein the first end of the longitudinal body is opposite to the second end of the longitudinal body;
wherein the longitudinal body includes a first portion that defines at the first end a first aperture;
wherein the longitudinal body includes a second portion, separate and distal from the first portion, that defines at the second end at least two protrusions extending from the second end, the at least two protrusions defining a space there-between,
wherein the at least two protrusions define an opening there-between having a narrow open portion and a wide center portion wherein the narrow open portion is located farther from the longitudinal body than the wide center portion, and
wherein the securing the second end of the string by the second end of the longitudinal body further comprises engaging the stretch film between the at least two protrusions.

8. The method of claim 7 wherein the securing the first end of the string by the first end of the longitudinal body further comprises engaging the stretch film with a protrusion extending from a distal end of the longitudinal body at the first portion and shaped to engage a portion of the string to impede slippage of the string into the first aperture.

9. The method of claim 7 wherein the engaging the stretch film between the two protrusions further comprises:
sliding the stretch film over sloped surfaces defined by the two protrusions that slope toward each other toward the space defined between the at least two protrusions.

10. The method of claim 7 wherein the second end of the string by the second end of the longitudinal body further comprises engaging the stretch film with at least two lateral protrusions extending laterally from a side of the longitudinal body.

11. The method of claim 10 wherein the engaging the stretch film with at least two lateral protrusions extending laterally from a side of the longitudinal body further comprises:
sliding the stretch film over sloped surfaces defined by the two protrusions that slope toward each other toward the space defined between the at least two protrusions; and
sliding the stretch film over sloped surfaces defined by the two lateral protrusions that slope toward each other toward the space defined between the at least two lateral protrusions.

12. The method of claim 7 further comprising securing the string in a least one middle aperture defined by the longitudinal body between the first end and the second end of the longitudinal body including being defined in part by a finger having a hook extending inwardly toward the middle aperture.

* * * * *